(12) United States Patent
Takahashi et al.

(10) Patent No.: US 9,672,861 B2
(45) Date of Patent: Jun. 6, 2017

(54) OPTICAL RECORDING MEDIUM

(71) Applicant: Sony Corporation, Tokyo (JP)

(72) Inventors: Kensaku Takahashi, Kanagawa (JP); Yo Ota, Tokyo (JP); Hidehiro Kosaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/778,338

(22) PCT Filed: Mar. 6, 2014

(86) PCT No.: PCT/JP2014/001227
§ 371 (c)(1),
(2) Date: Sep. 18, 2015

(87) PCT Pub. No.: WO2014/162658
PCT Pub. Date: Oct. 9, 2014

(65) Prior Publication Data
US 2016/0275983 A1 Sep. 22, 2016

(30) Foreign Application Priority Data
Apr. 1, 2013 (JP) ................................. 2013-076277

(51) Int. Cl.
| | |
|---|---|
| *B32B 3/02* | (2006.01) |
| *G11B 7/24041* | (2013.01) |
| *G11B 7/24038* | (2013.01) |
| *G11B 7/258* | (2013.01) |
| *G11B 7/26* | (2006.01) |
| *G11B 7/24085* | (2013.01) |

(Continued)

(52) U.S. Cl.
CPC ...... *G11B 7/24041* (2013.01); *G11B 7/24038* (2013.01); *G11B 7/258* (2013.01); *G11B 7/265* (2013.01); *B32B 9/005* (2013.01); *B32B 15/08* (2013.01); *B32B 2250/05* (2013.01); *B32B 2307/416* (2013.01); *B32B 2429/02* (2013.01); *G11B 7/24085* (2013.01); *G11B 2220/20* (2013.01)

(58) Field of Classification Search
CPC ..... G11B 7/242; G11B 7/258; G11B 7/24038; Y10T 428/21
See application file for complete search history.

(56) References Cited

U.S. PATENT DOCUMENTS

| | | | |
|---|---|---|---|
| 5,244,774 A * | 9/1993 | Usami ..................... | G11B 7/24 346/135.1 |
| 5,511,057 A | 4/1996 | Holtslag et al. | |

(Continued)

FOREIGN PATENT DOCUMENTS

| | | |
|---|---|---|
| EP | 0 517 490 A2 | 12/1992 |
| EP | 1 369 852 A2 | 12/2003 |

(Continued)

*Primary Examiner* — Elizabeth Mulvaney
(74) *Attorney, Agent, or Firm* — Wolf, Greenfield & Sacks, P.C.

(57) ABSTRACT

There is provided an optical recording medium including: three reproduction layers, wherein reflectance R1, R2, and R3 of the three reproduction layers on a side of a surface irradiated with reproduction light is equal to or greater than 5%, and wherein any absolute value of a difference delta R between two selected from the reflectance R1, R2, and R3 is equal to or less than 7%.

9 Claims, 7 Drawing Sheets

(51) Int. Cl.
  *B32B 9/00*  (2006.01)
  *B32B 15/08*  (2006.01)

(56) References Cited

U.S. PATENT DOCUMENTS

| | | | |
|---|---|---|---|
| 7,826,323 | B2 | 11/2010 | Hayashi |
| 8,111,477 | B2 | 2/2012 | Nakagawa |
| 8,369,201 | B2 | 2/2013 | Saito et al. |
| 8,379,503 | B2 | 2/2013 | Yamatsu et al. |
| 8,416,656 | B2 | 4/2013 | Nishi |
| 8,582,402 | B2 | 11/2013 | Horigome |
| 8,685,517 | B2 | 4/2014 | Miki et al. |
| 8,867,324 | B2 | 10/2014 | Sekiguchi et al. |
| 8,929,190 | B2 | 1/2015 | Saito et al. |
| 9,111,555 | B2 | 8/2015 | Igari et al. |
| 2006/0285461 | A1 | 12/2006 | Ashizaki et al. |
| 2007/0286048 | A1 | 12/2007 | Hayashi |
| 2008/0084812 | A1 | 4/2008 | Tabata et al. |
| 2010/0007984 | A1 | 1/2010 | Nakagawa |
| 2010/0074084 | A1 | 3/2010 | Mishima et al. |
| 2010/0208563 | A1 | 8/2010 | Nakao et al. |
| 2011/0242951 | A1 | 10/2011 | Saito et al. |
| 2012/0008484 | A1 | 1/2012 | Yamatsu et al. |
| 2012/0106308 | A1 | 5/2012 | Horigome |
| 2012/0182851 | A1 | 7/2012 | Saito et al. |
| 2012/0201993 | A1* | 8/2012 | Tabata ............... G11B 7/2403 428/64.4 |
| 2012/0294131 | A1 | 11/2012 | Nishi |
| 2013/0010583 | A1 | 1/2013 | Miyamoto et al. |
| 2013/0052389 | A1 | 2/2013 | Miki et al. |
| 2013/0235713 | A1 | 9/2013 | Suzuki |
| 2013/0322228 | A1 | 12/2013 | Saito et al. |
| 2014/0036651 | A1 | 2/2014 | Sekiguchi et al. |
| 2014/0044940 | A1 | 2/2014 | Ikuta et al. |
| 2014/0322476 | A1 | 10/2014 | Igari et al. |
| 2016/0155468 | A1 | 6/2016 | Nishi et al. |
| 2016/0196848 | A1 | 7/2016 | Nishi et al. |
| 2016/0218808 | A1 | 7/2016 | Nishi et al. |

FOREIGN PATENT DOCUMENTS

| | | |
|---|---|---|
| EP | 1 701 348 A2 | 9/2006 |
| JP | 09-161314 A | 6/1997 |
| JP | 10-503872 A | 4/1998 |
| JP | 2006-059433 A | 3/2006 |
| JP | 2006-236569 A | 9/2006 |
| JP | 2006-313585 A | 11/2006 |
| JP | 2008-251140 A | 10/2008 |
| JP | 2009-004063 A | 1/2009 |
| JP | 2011-198410 A | 10/2011 |

\* cited by examiner

OPTICAL RECORDING MEDIUM

CROSS REFERENCE TO RELATED APPLICATIONS

This application claims the benefit of Japanese Priority Patent Application JP 2013-076277 filed Apr. 1, 2013, the entire contents of which are incorporated herein by reference.

TECHNICAL FIELD

The present technology relates to an optical recording medium. Specifically, the present technology relates to an optical recording medium provided with a plurality of reproduction layers.

BACKGROUND ART

Compact Discs (CDs), Digital Versatile Discs (DVDs), and the like have leaded the market of optical recording media hitherto. However, a further increase in capacity of optical recording media has been demanded with distribution of high-definition televisions and a rapid increase in data handled by Personal Computers (PCs) in recent years. In order to respond to such a demand, high-capacity optical recording media compatible with blur laser, such as a Blu-ray Disc (BD) (registered trademark) have appeared, and a market of new high-capacity optical recording media has been launched.

A technique of providing multiple recording layers in order to further increase recording capacity in high-density optical recording media such as a DVD and a BD has widely been employed. Particularly, development of a multilayered optical recording medium provided with three or more recording layers has been advanced in recent years.

However, a signal property deteriorates due to interlayer stray light if multiple recording layers are provided. If three or more recording layers are provided in particular, stray light from parts other than a recording layer from which an information signal is intended to be read increases, and therefore, the signal property particularly significantly deteriorates.

For this reason, a technique of effectively suppressing an influence of the stray light and enhancing the signal property has been examined for the multilayered optical recording medium in the related art. PTLs 1 and 2 disclose techniques of removing an influence of multiple reflection caused by the stray light by setting the thickness of a spacer between information recording layers so as to satisfy a predetermined relationship.

CITATION LIST

Patent Literature

PTL 1: Japanese Unexamined Patent Application Publication No. 2006-59433
PTL 2: Japanese Unexamined Patent Application Publication No. 2011-198410

SUMMARY

Technical Problem

It is desirable to provide an optical recording medium capable of suppressing deterioration in a signal property due to interlayer stray light.

Solution to Problem

According to an embodiment of the present technology, there is provided an optical recording medium including: three reproduction layers, wherein reflectance R1, R2, and R3 of the three reproduction layers on a side of a surface irradiated with reproduction light is equal to or greater than 5%, and wherein any absolute value of a difference delta R between two selected from the reflectance R1, R2, and R3 is equal to or less than 7%.

According to the present technology, since the reflectance R1, R2, and R3 of the three reproduction layers on the side of the surface irradiated with the reproduction light is equal to or greater than 5%, it is possible to suppress deterioration in a signal property due to deterioration in the reflectance. In addition, since any difference delta R between two selected from the reflectance R1, R2, and R3 is equal to or less than 7%, it is possible to suppress deterioration in the signal property due to an influence of stray light from the reproduction layer with high reflectance on light reflected by the reproduction layer with low reflectance.

According to the present technology, the reflectance R1, R2, and R3 is reflectance when light with a wavelength of 405 nm is vertically incident to the surfaces of the three reproduction layers.

According to the present technology, the reproduction layers are layer including flat surfaces provided with multiple concave portions and convex portions so as to record an information signal in advance. By irradiating the concave-convex surface provided with the concave portions and the convex portions with light, the information signal is read.

According to the present technology, it is preferable that the three reproduction layers be provided on a substrate and that a cover layer is provided on the three reproduction layers. The thickness of the cover layer is not particularly limited, and the cover layer includes a substrate, a sheet, a coating layer, or the like. For a high-density information recording media, it is preferable to employ a thin light transmission layer such as a sheet or a coating layer as the cover layer in consideration of usage of an objecting lens with high NA and to employ a configuration in which the information signal is reproduced by irradiating the information recording medium with light from the side of the light transmission layer. In such a case, it is also possible to employ an opaque substrate. At least one of the surfaces on the cover layer side and on the substrate side is appropriately set as a light incident surface for reproducing the information signal, in accordance with a format of the information recording medium.

Advantageous Effects of Invention

According to the present technology, it is possible to suppress deterioration in a signal property due to interlayer stray light as described above.

DESCRIPTION OF EMBODIMENTS

Embodiments of the present technology will be described in the following order.
1. Configuration of Optical Recording Medium
2. Optical Property of Optical Recording Medium
3. Method for Manufacturing Optical Recording Medium <1. Configuration of Optical Recording Medium>

Figure 1A:
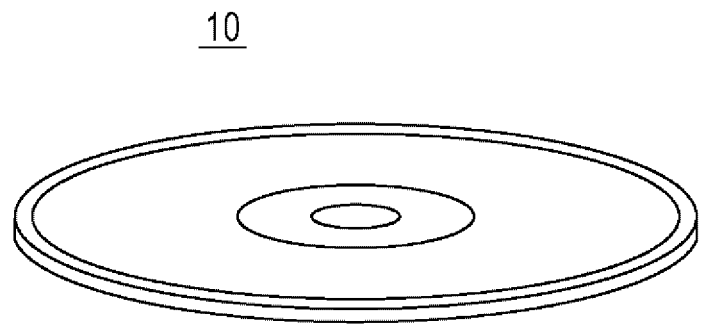
FIG. 1A is a perspective view showing an example of appearance of an optical recording medium according to an embodiment of the present technology.

As shown in FIG. 1A, an optical recording medium 10 according to an embodiment of the present technology has a disc shape with an opening (hereinafter, referred to as a "center hole") provided at the center thereof. In addition, the shape of the optical recording medium 10 is not limited to the example and can be a card shape or the like.

Figure 1B:
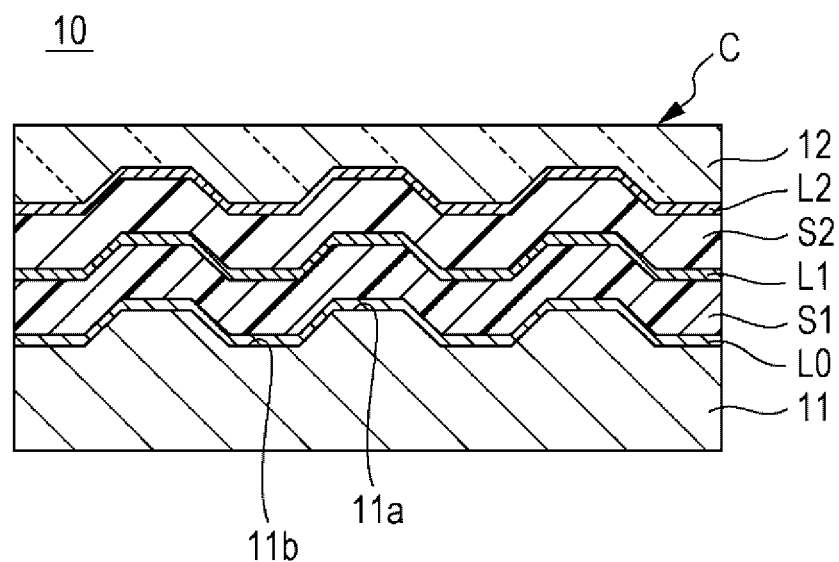
FIG. 1B is a cross-sectional view showing an example of a configuration of the optical recording medium according to the embodiment of the present technology.

As shown in FIG. 1B, the optical recording medium 10 according to the embodiment of the present technology has a configuration in which a reflecting layer L0 as a first reproduction layer, an intermediate layer S1, a reflecting layer L1 as a second reproduction layer, an intermediate layer S2, a reflecting layer L2 as a third reproduction layer, and a light transmission layer 12 as a cover layer are laminated on the surface of a substrate 11 in this order. In a case where the reflecting layers L0 to L2 are not particularly distinguished in the following description, the reflecting layers L0 to L2 will be collectively referred to as reflecting layers.

The optical recording medium 10 according to the embodiment is a so-called multilayered reproduction-dedicated optical recording medium, and an information signal is reproduced by irradiating the respective reflecting layers L0 to L2 with laser light from a surface C on a side of the light transmission layer 12. The information signal is reproduced by collecting laser light with a wavelength within a range of equal to or greater than 400 nm and equal to or less than 410 nm by an objective lens with a numerical aperture within a range of equal to or greater than 0.84 and equal to or less than 0.86, for example, and irradiating the respective reflecting layers L0 to L2 with the collected laser light from the side of the light transmission layer 12. Examples of such an optical recording medium 10 include a multilayered reproduction-dedicated Blu-ray disc (registered trademark). Hereinafter, the surface C which is irradiated with the laser light for causing the reflecting layers L0 to L2 to reproduce the information signal will be referred to as a light irradiation surface C.

Hereinafter, the substrate 11, the reflecting layers L0 to L2, the intermediate layers S1 and S2, and the light transmission layer 12, which configure the optical recording medium 10, will be sequentially described.

Substrate

The substrate 11 has a disc shape with a center hole provided at the center thereof, for example. A main surface of the substrate 11 is a concave-convex surface, and a film of the reflecting layer L0 is formed on the concave-convex surface. The concave-convex surface is configured of lands 11a and multiple pits 11b. The multiple pits 11b configure concentric arrays (so-called tracks) or a spiral array on the surface of the substrate 11. The pits 11b may be pits (In-Pits) which have concave shapes with respect to the lands 11a or pits (On-Pits) which have convex shapes with respect to the lands 11a. FIG. 1B shows an example of the substrate 11 which include the pits 11b with the concave shapes with respect to the lands 11a.

For example, the substrate 11 with the dimension (diameter) of 120 mm is selected. The thickness of the substrate 11 is selected in consideration of rigidity, the substrate 11 with the thickness of equal to or greater than 0.3 mm and equal to or less than 1.3 mm is preferably selected, the substrate 11 with the thickness of equal to or greater than 0.6 mm and equal to or less than 1.3 mm is more preferably selected, and for example, the substrate 11 with the thickness of 1.1 mm is selected. The center hole with a dimension (diameter) of 15 mm is selected, for example.

It is possible to use a plastic material or glass, for example, as a material of the substrate 11, and it is preferable to use the plastic material from a viewpoint of cost. As the plastic material, it is possible to use polycarbonate resin, polyolefin resin, acrylic resin, or the like.

Reflecting Layer

The reflecting layers L0 to L2 are reflecting layers (reproduction-dedicated recording layers) capable of reproducing an information signal by being irradiated with laser light. The reflecting layers L0 to L2 have recording capacity of equal to or greater than 25 GB with respect to a wavelength of 405 nm and a collecting lens numerical aperture NA of 0.85. The information signal from the reflecting layer L0 is read through the reflecting layers L1 and L2, the information signal from the reflecting layer L1 is read through the reflecting layer L2, and therefore, translucent layers which reflect a part of the laser light and transmit the rest of the laser light are used as the reflecting layers L1 and L2.

It is preferable that the reflecting layers L0 and L1 contain metal as a main constituent. Here, semimetal is also included in the metal. As the metal, it is possible to use one kind selected from a group including Al, Ag, Au, Ni, Cr, Ti, Pd, Co, Si, Ta, W, Mo, Ge, and the like alone or use alloy containing two or more kinds from the group. Among the group, it is particularly preferable to use an Al-based, Ag-based, Au-based, Si-based, or Ge-based material in terms of practical use. As the alloy, Al—Ti, Al—Cr, Al—Cu, Al—Mg—Si, Ag—Nd—Cu, Ag—Pd—Cu, Ag—Pd—Ti, Si—B, or the like are preferably used. It is preferably determine a material among these materials in consideration of optical properties. For example, it is preferable to use an Al-based or Ag-based material if high reflectance in a short wavelength region is taken into consideration. As materials contained in the reflecting layers L0 and L1, different materials may be used in consideration of a necessary signal property. For example, Al alloy can be used as the material contained in the reflecting layer L0 and Ag alloy can be used as the material contained in the reflecting layer L1.

If the reflecting layer L0 contains metal such as Al alloy as a main constituent, the film thickness of the reflecting layer L0 is preferably within a range of equal to or greater than 15 nm and equal to or less than 25 nm. If the film thickness of the reflecting layer L0 is less than 15 nm, defects such as corrosion easily occur, and reliability deteriorates. In addition, deterioration in reflectance due to the decrease in the film thickness also causes degradation in the signal property. In contrast, an increase in the film thickness of the reflecting layer L0 so as to exceed 25 nm does not have any advantage. That is, if the reflecting layer L0 has a sufficient thickness (from about 15 nm to about 25 nm, for example) from the viewpoints of reflectance and reliability, a further increase results only in an increase in a manufacturing tact time and an increase in material cost.

When the reflecting layer L1 contains metal such as Ag alloy as a main constituent, the film thickness of the reflecting layer L1 is preferably within a range of equal to or greater than 15 nm and equal to or less than 23 nm. If the film thickness of the reflecting layer L1 is less than 15 nm, defects such as corrosion easily occur, and reliability deteriorates. In addition, a decrease in reflectance due to the decrease in the film thickness also causes degradation in the signal property. In contrast, if the film thickness of the reflecting layer L1 exceeds 23 nm, reflectance of the reflecting layer L0 decreases due to a decrease in the transmittance. Therefore, the signal property of the reflecting layer L0 is significantly degraded.

The reflecting layer L2 is provided at a position which is the closest to the light irradiation surface C among the reflecting layers L0, L1, and L2. The reflecting layer L2 contains metal, metal oxide, or metal nitride, for example, as a main constituent, and it is preferable that the reflecting layer L2 contain metal oxide or metal nitride as a main constituent among these materials. If the reflecting layer L2 contains metal oxide or metal nitride as a main constituent, it is possible to enhance reliability of the optical recording medium 10. In addition, it is also possible to suppress degradation in the properties of the reflecting layers L1 and L2 by a battery effect between the reflecting layers L1 and L2. As metal oxide or metal nitride, it is possible to use a dielectric body, for example.

As metal oxide, it is possible to use metal oxide of one or more elements selected from a group including W, Fe, Ti, In, Zn, Sn, Al, Si, Ge, Ti, Ga, Ta, Nb, Hf, Zr, Cr, Bi, and Mg, for example, and it is preferable to use metal oxide of one or more elements selected from a group including W, Fe, Ti, In, Sn, Si, and Zr. This is because it is possible to set a refractive index n of the reflecting layer L2 within a range of equal to or greater than 2.0 and equal to or less than 2.7 and set an extinction coefficient k of the reflecting layer L2 within a range of equal to or greater than 0.01 and equal to or less than 0.5 by using such metal oxide and adjusting the composition thereof. Specific examples of metal oxide include ZnS—$SiO_2$, $SiO_2$—$In_2O_3$—$ZrO_2$(SIZ), $SiO_2$—$Cr_2O_3$—$ZrO_2$ (SCZ), $In_2O_3$—$SnO_2$(ITO), $In_2O_3$—$CeO_2$ (ICO), $In_2O_3$—$Ga_2O_3$(IGO), $In_2O_3$—$Ga_2O_3$—ZnO(IGZO), $Sn_2O_3$—$Ta_2O_5$(TTO), $TiO_2$—$SiO_2$, $Al_2O_3$—ZnO, and $Al_2O_3$—BaO.

As metal nitride, it is possible to use nitride of one or more elements selected from a group including In, Sn, Ge, Cr, Si, Al, Nb, Mo, Ti, Nb, Mo, Ti, W, Ta, and Zn. Specific examples of metal nitride include TiN, SiN, CrN, and WN.

When the reflecting layer L2 contains metal oxide or metal nitride as a main constituent, and the reflecting layers L0 and L1 contain metal as a main constituent, the film thickness of the reflecting layer L2 is preferably thicker than those of the reflecting layers L0 and L1. With such a configuration, it is possible to set a sufficient value as reflectance R2 of the reflecting layer L2 on the side of the light irradiation surface C.

When the reflecting layer L2 contains metal oxide or metal nitride as a main constituent, the film thickness of the reflecting layer L2 is preferably within a range of equal to or greater than 15 nm and equal to or less than 50 nm. If the film thickness of the reflecting layer L2 is less than 15 nm, the signal property tends to deteriorate. In contrast, an increase in the film thickness of the reflecting layer L2 so as to exceed 50 nm results only in an increase in film formation time and an increase in film formation cost of the reflecting layer L2, and no technical advantage can be achieved. This is because reflectance periodically repeats an increase and a decrease with respect to the film thickness of the reflecting layer L2 and the first peak appears at a position of equal to or less than 50 nm when the reflecting layer L2 contains metal oxide or metal nitride as a main constituent.

The refractive index n of the reflecting layer L2 is preferably within a range of equal to or greater than 2.0 and equal to or less than 2.7. If the refractive index n is less than 2.0, a difference from the refractive index of the light transmission layer (refractive index: 1.5 to 1.6) is excessively small, and the reflectance R2 of the reflecting layer L2 on the side of the light irradiation surface S tends to be less than 5%. In contrast, if the refractive index n exceeds 2.7, the light intensity of the reflected light at an interface between the light transmission layer 12 and the reflecting layer L2 and at an interface between the reflecting layer L2 and the intermediate layer S2 excessively increases, and it tends to be difficult to cause laser light with sufficient light intensity to reach the reflecting layers L0 and L1. Therefore, the reflectance of the reflecting layers L1 and L2 on the side of the light irradiation surface S tends to be less than 5%.

The extinction coefficient k of the reflecting layer L2 is preferably within a range of equal to or greater than 0.01 and equal to or less than 0.5. It is difficult to set the extinction coefficient k to be less than 0.01 by changing a composition of metal oxide or metal nitride contained in the reflecting layer L2. In contrast, if the extinction coefficient k of the reflecting layer L2 exceeds 0.5, a laser light absorption amount of the reflecting layer L2 is excessively large, and it tends to be difficult to cause laser light with sufficient light intensity to reach the reflecting layers L1 and L2. Therefore, the reflectance of the reflecting layers L1 and L2 on the side of the light irradiation surface S tends to be less than 5%.

The aforementioned refractive index n and the extinction coefficient k are obtained as follows.

First, a composition of the reproduction layer L2 in the optical recording medium 10 is analyzed. Then, a thin film with the same composition as that of the reproduction layer L2 is formed on an Si wafer, a refractive index n and an extinction coefficient k of the thin film are then obtained by using a spectroscopic ellipsometer. Here, the refractive index n and the extinction coefficient k are values when laser light with a wavelength of 405 nm is vertically incident on the surface of the thin film.

Intermediate Layer

The intermediate layers S1 and S2 serves for separating the reflecting layers L0 to L2 with physically and optically sufficient distances, and the surfaces thereof are formed as concave-convex surfaces. The configuration of the concave-convex surfaces is the same as that of the aforementioned substrate 11.

When the reflecting layers L0 and L1 contain metal, and the reflecting layer L2 contains metal oxide or metal nitride, pits 11b of the intermediate layer S2 are preferably deeper or higher compared to pits 11b of the intermediate layer S1 and the substrate 11. Here, the pits 11b with such a relationship may be pits (In-Pits) which have concave shapes or pits (On-Pits) which have convex shapes. By meeting the aforementioned relationship, it is possible to reduce a difference in asymmetry of the reflecting layers L0, L1, and L2. That is, it is possible to suppress non-uniformity in appearances of the pit depths of the reflecting layers L0, L1, and L2.

The thicknesses of the intermediate layers S1 and S2 are preferably set within a range of equal to or greater than 9 micrometers and equal to or less than 50 micrometers. Although materials of the intermediate layers Si and S2 are not particularly limited, it is preferable to use an ultraviolet curable acrylic resin. In addition, it is preferable that the intermediate layers S1 and S2 have sufficiently high light transmitting property since the intermediate layers S1 and S2 function as optical paths of the laser light for reproducing the information signal from the reflecting layer L0 on the further side.

Light Transmission Layer

The light transmission layer 12 is a resin layer which is obtained by curing photosensitive resin such as ultraviolet curable resin. Examples of a material of the resin layer include ultraviolet curable acrylic resin. In addition, the light transmission layer 12 may be configured of a light transmitting sheet with a circular ring shape and an adhesive layer for attaching the light transmitting sheet to the substrate 11. The light transmitting sheet is preferably made of a material with low absorption capability with respect to the laser light used for reproduction, and specifically, the light transmitting sheet is preferably made of a material with transmittance of equal to or greater than 90%. As a material of the light transmitting sheet, it is possible to use a polycarbonate resin material, a polyolefin resin (ZEONEX (registered trademark)), or the like. As a material of the adhesive layer, it is possible to use ultraviolet curable resin, a pressure sensitive adhesive (PSA), or the like.

The thickness of the light transmission layer 12 is preferably selected from a range of equal to or greater than 10 micrometers and equal to or less than 177 micrometers, and 100 micrometers is selected, for example. By combining such a thin light transmission layer 12 and the objective lens with a high numerical aperture of about 0.85, for example, it is possible to realize high-density recording.

Hard Coating Layer

Although not shown in the drawing, the light irradiation surface C of the light transmission layer 12 may be further provided with a hard coating layer for protecting the light irradiation surface C from mechanical impact and scratch and for protecting information signal reproduction quality from adhesion of dust and fingerprint when a user deals with the optical recording medium. As the hard coating layer, it is possible to use a material in which silica gel fine powder is mixed to enhance mechanical strength or solvent type or solventless type ultraviolet curable resin. In order for the hard coating layer to have mechanical strength and water repellency or oil repellency, the thickness of the hard coating layer is preferably from about 1 micrometer to several micrometers.

<2. Optical Property of Optical Recording Medium>

If it is assumed that R0, R1, and R2 respectively represent the reflectance of the reflecting layers L0, L1, and L2 on the side of the light irradiation surface C, all the reflectance R1, R2, and R3 is equal to or greater than 5% and is preferably equal to or greater than 7%. If any one of the reflectance R1, R2, and R3 is less than 5%, the signal property of the reflecting layer L with the reflectance of less than 5% deteriorates due to the decrease in the reflectance, and it is difficult to reproduce the information signal by a consumer use drive. Here, all the reflectance R1, R2, and R3 is reflectance of land portions (8T spaces).

Any absolute value of a difference delta R between two selected from the reflectance R1, R2, and R3 (that is, all absolute value of (R1-R2), absolute value of (R1-R3), and absolute value of (R2-R3)) is equal to or less than 7%. If the difference delta R of the reflectance exceeds 7%, light reflected by a reflecting layer L with low reflectance is affected by stray light from a reflecting layer L with high reflectance among the reflecting layers L0, L1, and L2, and the signal property deteriorates.

All the reflectance R1, R2, and R3 is preferably equal to or greater than 5% and equal to or less than 12%, or equal to or greater than 7% and equal to or less than 14%. This is because it is possible to suppress the deterioration in the signal property due to the decrease in reflectance and suppress the deterioration in the signal property due to the influence of the stray light if the reflectance R1, R2, and R3 is set within such a range in consideration of the aforementioned value of the difference delta R of the reflectance.

The transmittance of the reflecting layer L2 is preferably equal to or greater than 70%. With such a configuration, it is possible to cause laser light with sufficient light intensity to reach the reflecting layers L0 and L1. That is, it is possible to set sufficient values as the reflectance R0 and R1 of the reflecting layers L0 and L1 on the side of the light irradiation surface C.

<3. Method for Manufacturing Optical Recording Medium>

Next, a description will be given of an example of a method for manufacturing the optical recording medium according to the embodiment of the present technology.

Process for Molding Substrate

First, the substrate 11 which has one main surface with the concave-convex surface formed thereon is molded. As a method for molding the substrate 11, it is possible to use an injection molding (injection) method, a photopolymer method (2P method: Photo Polymerization), or the like.

Process for Forming Reflecting Layer 1

Next, the substrate 11 is transported to the inside of a vacuum chamber provided with a target for forming the reflecting layer L0, and the inside of the vacuum chamber is vacuumed up to a predetermined pressure. Thereafter, the target is sputtered while process gas such as Ar gas is introduced into the vacuum chamber, and the film of the reflecting layer L0 is formed on the concave-convex surface of the substrate 11.

Process for Forming Intermediate Layer 1

Next, the substrate 11 is transported to a spin coater, and the reflecting layer L0 is uniformly coated with ultraviolet curable resin by spin coating. Thereafter, a concave-convex pattern of a stamper is pressed onto the ultraviolet curable resin, with which the reflecting layer L0 is uniformly coated, the ultraviolet curable resin is irradiated with ultraviolet ray to be cured, and the stamper is then ripped off. By such operations, the concave-convex pattern of the stamper is transferred onto the ultraviolet curable resin, and the intermediate layer S1 with the concave-convex surface is formed on the reflecting layer L0.

Process for Forming Reflecting Layer 2

Next, the substrate 11 is transported to the inside of a vacuum chamber provided with a target for forming the reflecting layer L1, and the inside of the vacuum chamber is vacuumed up to a predetermined pressure. Thereafter, the target is sputtered while process gas such as Ar gas is introduced into the vacuum chamber, and the film of the reflecting layer L1 is formed on the substrate 11.

Process for Forming Intermediate Layer 2

Next, the intermediate layer S2 is formed on the reflecting layer L1 in the same manner as in the process for forming the intermediate layer S1. In addition, convex portions of a stamper for forming the concave-shaped pits 11b on the intermediate layer S2 are preferably higher than convex portions of the stampers for forming the concave-shaped pits 11b on the intermediate layer S1 and the substrate 11. Alternatively, grooves of the stamper for forming convex-shaped pits 11b on the intermediate layer S2 are preferably deeper than grooves of the stampers for forming convex-shaped pits 11b on the intermediate layer S1 and the substrate 11. The depths of the grooves and the heights of the convex portions of the stamper can be set as described above by adjusting exposure power and etching conditions in a mastering process.

Process for Forming Film of Reflecting Layer

Next, the substrate 11 is transported to the inside of a vacuum chamber provided with a target for forming the reflecting layer L2, and the inside of the vacuum chamber is vacuumed up to a predetermined pressure. Thereafter, the target is sputtered while process gas such as Ar gas or $O_2$ gas is introduced into the vacuum chamber, and the film of the reflecting layer L2 is formed on the intermediate layer S2.

Process for Forming Light Transmission Layer

Next, the substrate 11 is transported to a spin coater, and the reflecting layer L2 is uniformly coated with photosensitive resin such as ultraviolet curable resin (UV resin) by spin coating, and the photosensitive resin is irradiated with light such as ultraviolet ray to cure the photosensitive resin. By such operations, the light transmission layer 12 is formed on the reflecting layer L2.

By the processes described above, the targeted optical recording medium 10 is obtained.

Advantages

Since any difference delta R between two selected from the reflectance R1, R2, and R3 is equal to or less than 7% in this embodiment, it is possible to suppress deterioration in the signal property caused by the influence of the stray light from the reflecting layer L with high reflectance on the light reflected by the reflecting layer L with low reflectance.

When the reflecting layer L2 located at the closest position to the light irradiation surface C contains metal oxide or metal nitride as a main constituent, it is possible to enhance reliability of the optical recording medium 10 compared to a case where the reflecting layer L2 contains metal as a main constituent.

EXAMPLES

Although the present technology will be described below in detail, the present technology is not limited to the following examples.

The examples will be described in the following order.

I. Reflectance Dependency of Signal Property
II. Allowable Range of Variations in Reflectance of Multiple Reflecting Layers
III. Reliability of Metal Oxide Layer
IV. Preferable Ranges of Refractive Index and Extinction Coefficient of Reflecting Layer
V. Preferable Range for Film Thickness of Metal Oxide Layer (Lower Limit)
VI. Preferable Range for Film Thickness of Metal Oxide Layer (Upper Limit)
VII. Film Thickness Dependency of Signal Property and Asymmetry I. Reflectance Dependency of Signal Property Reference Examples 1-1 to 1-7

First, a polycarbonate substrate with a thickness of 1.1 mm was molded by injection molding. Concavities and convexities configured of lands and multiple pits (In-Pits) which had concave shapes with respect to the lands were formed on the surface of the polycarbonate substrate. In this process, the size (length) and the track pitch of the pits were set so as to be able to obtain recording capacity corresponding to 33.4 GB for each reflecting layer.

Next, the reflecting layer was formed on the concave-convex surface of the polycarbonate substrate by the sputtering method. In this process, film formation conditions and target materials of the sputtering were selected for each sample so as to be able to obtain different reflectance for each sample.

Next, a light transmission layer with a thickness of 100 micrometers was formed by uniformly coating the reflecting layer with the ultraviolet curable resin by the spin coating method and irradiating the ultraviolet curable resin with ultraviolet ray to cure the ultraviolet curable resin.

As described above, reproduction-dedicated optical recording media with recording capacity of 33.4 GB were obtained.

Evaluation 1

Reflectance and signal properties of the reflecting layers in the optical recording media in Reference Examples 1-1 to 1-7 obtained as described above were evaluated as follows. The results thereof will be shown in Table 1 and FIG. 2.

Reflectance 1

The reflectance of the reflecting layers was measured by a disc evaluation apparatus for BDs (manufactured by Pulstec Industrial Co, Ltd.; Product name: ODU-1000). Specifically, the optical recording media were reproduced (focusing, tracking, and the like) by using the disc evaluation apparatus for BDs, and reflectance was obtained from reflection level of 18H (also referred to as an ("8T space" or "8T land"). In addition, the wavelength of laser light for reproduction of the evaluation apparatus was 405 nm, and the numerical aperture NA of the collecting lens was 0.85.

Signal Properties 1

The reproduction signal properties of the reflecting layers were evaluated by using a disc evaluation apparatus for BDs (manufactured by Pulstec Industrial Co, Ltd.; Product name: ODU-1000). For evaluating the signal quality, an evaluation criterion called i-MLSE, which was used for BD-XL, was used. In addition, i-MLSE is an evaluation criterion indicating a deviation amount from an ideal pit edge position when a 2T-8T pit array is reproduced. A wavelength of laser light for reproduction of the evaluation apparatus was 405 nm, and the numerical aperture of the collecting lens was 0.85.

Table 1 shows evaluation results of the optical recording media in Reference Examples 1-1 to 1-7.

TABLE 1

|  | Reflectance [%] | i-MLSE [%] |
|---|---|---|
| Reference Example 1-1 | 4.5 | 12.6 |
| Reference Example 1-2 | 6.3 | 11.2 |
| Reference Example 1-3 | 8.6 | 10.5 |
| Reference Example 1-4 | 11 | 10 |
| Reference Example 1-5 | 16 | 9.7 |
| Reference Example 1-6 | 20 | 9.5 |
| Reference Example 1-7 | 45 | 9.2 |

Figure 2:
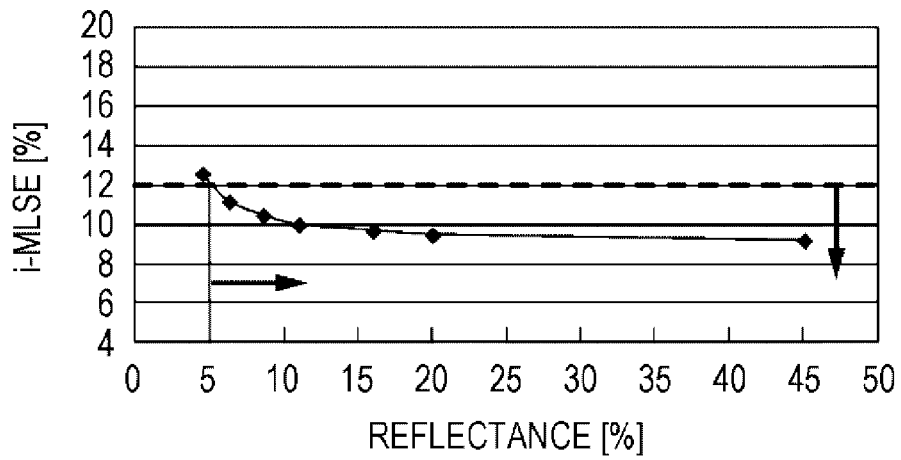
FIG. 2 is a diagram showing evaluation results of reflectance and signal properties of optical recording media in Reference Examples 1-1 to 1-7.

It is possible to know the following facts from Table 1 and FIG. 2.

As the reflectance increased, i-MLSE tended to increase. Specifically, i-MLSE was significantly enhanced with respect to the increase in the reflectance when the reflectance was in a range of equal to or greater than 4.5% and equal to or less than 11%. In addition, i-MLSE was moderately enhanced with respect to the increase in the reflectance when the reflectance was in a range of equal to or greater than 11% and equal to or less than 45%.

When the reflectance was equal to or greater than 5%, i-MLSE was enhanced to a level of equal to or less than a reference value of 12%. When i-MLSE is equal to or less than the reference value of 12%, it is possible to achieve a satisfactory reproduction property even if there are variations in reproduction systems of consumer use drives.

II. Allowable Range of Variations in Reflectance of Multiple Reflecting Layers

Examples 2-1 to 2-4 and Comparative Examples 2-1 to 2-3

First, a polycarbonate substrate with a thickness of 1.1 mm was molded by injection molding. Concavities and convexities configured of lands and multiple pits (In-Pits) which had concave shapes with respect to the lands were formed on the surface of the polycarbonate substrate. In this process, the size (length) and the track pitch of the pits were set so as to be able to obtain recording capacity corresponding to about 33.4 GB for each reflecting layer.

Next, a first reflecting layer (L0 layer) with a film thickness of 19 nm, which was made of Al alloy, was formed on the concave-convex surface of the polycarbonate substrate by the sputtering method.

Next, the first reflecting layer was uniformly coated with the ultraviolet curable resin by the spin coating method. Thereafter, the concave-convex pattern of the stamper was pressed onto the ultraviolet curable resin, with which the first reflecting layer was uniformly coated, the ultraviolet curable resin was irradiated with ultraviolet ray to be cured, and the stamper was then ripped off. By such operations, an intermediate layer with a thickness of 15.5 micrometers was formed. In addition, concavities and convexities configured of lands and multiple pits (In-Pits) which had concave shapes with respect to the lands were formed on the surface of the intermediate layer. In this process, the size (length) and the track pitch of the pits were set so as to be able to obtain recording capacity corresponding to about 33.4 GB for each reflecting layer.

Next, a second reflecting layer (L1 layer) with a film thickness of 12 nm, which was made of Ag alloy, was formed on the concave-convex surface of the intermediate layer by the sputtering method.

Next, the second reflecting layer was uniformly coated with the ultraviolet curable resin by the spin coating method. Thereafter, the concave-convex pattern of the stamper was pressed onto the ultraviolet curable resin, with which the second reflecting layer was uniformly coated, the ultraviolet curable resin was irradiated with ultraviolet ray to be cured, and the stamper was then ripped off. By such operations, an intermediate layer with a thickness of 19.5 micrometers was formed. In addition, concavities and convexities configured of lands and multiple pits (In-Pits) which had concave shapes with respect to the lands were formed on the surface of the intermediate layer. In this process, the size (length) and the track pitch of the pits were set so as to be able to obtain recording capacity corresponding to about 33.4 GB for each reflecting layer.

Next, a third reflecting layer (L3 layer) made of ITO ($SnO_2$:$In_2O_3$=10:90 (% by mass)) was formed on the concave-convex surface of the intermediate layer by the sputtering method. In this process, film formation conditions and target materials of the sputtering were selected for each sample so as to be able to obtain different reflectance for each sample.

Next, a light transmission layer with a thickness of 53.5 micrometers was formed by uniformly coating the third reflecting layer with the ultraviolet curable resin by the spin coating method and irradiating the ultraviolet curable resin with ultraviolet ray to cure the ultraviolet curable resin.

As described above, three-layered reproduction-dedicated optical recording media with recording capacity of 100 GB were obtained.

Evaluation 2

Reflectance and signal properties of the first to third reflecting layers (L0 to L2 layers) of the optical recording media in Examples 2-1 to 2-4 and Comparative Examples 2-1 to 2-3 obtained as described above were evaluated as follows.

Reflectance 2

First, reflectance of each of the first to third reflecting layers was obtained in the same manner as in Reference Examples 1-1 to 1-7. Then, the maximum reflectance $R_{max}$ and the minimum reflectance $R_{min}$ of each reflecting layer were selected, and a difference delta $R=(R_{max}-R_{min})$ therebetween was obtained. The results will be shown in Table 2.

Signal Properties 2

First, i-MLSE of each of the first to third reflecting layers was obtained in the same manner as in Reference Examples 1-1 to 1-7. Then, it was determined whether or not a reflecting layer with i-MLSE which exceeded the reference value of 12% was present among the first to third reflecting layers. The results thereof will be shown in Table 2. Then, maximum i-MLSE was selected from i-MLSE of the first to third reflecting layers (hereinafter, referred to as "maximum i-MLSE"). The results thereof will be shown in Table 2. Then, a graph was created based on the difference delta R in the reflectance and the maximum i-MLSE which was obtained as described above, and an approximate straight line representing a relationship between the difference delta R in the reflectance and the maximum i-MLSE was obtained. The results will be shown in FIG. 3. The approximate straight line was obtained by the linear approximation method.

Table 2 shows configurations and evaluation results of the optical recording media in Examples 2-1 to 2-4 and Comparative Examples 2-1 to 2-3.

TABLE 2

|  | Reflectance [%] | | | Difference delta R in reflectance (=Rmax − Rmin) [%] | i-MLSE [%] | | | Presence of Layer with i-MLSE which exceeds reference value |
| --- | --- | --- | --- | --- | --- | --- | --- | --- |
|  | L0 layer | L1 layer | L2 layer |  | L0 layer | L1 layer | L2 layer |  |
| Example 2-1 | 11.1 | 11.8 | 13.1 | 2.0 | 10.17 | 10.87 | 10.09 | None |
| Example 2-2 | 14.5 | 9.8 | 11.2 | 4.6 | 9.94 | 11.4 | 9.97 | None |
| Example 2-3 | 15.6 | 9.4 | 11.6 | 6.2 | 10.23 | 11.50 | 10.76 | None |
| Example 2-4 | 10.2 | 9.5 | 16.4 | 6.8 | 10.23 | 11.5 | 10.13 | None |
| Comparative Example 2-1 | 15.1 | 14.5 | 8.0 | 7.1 | 10.01 | 10.31 | 12.12 | Present (L2 layer) |
| Comparative Example 2-2 | 3.7 | 2.4 | 14.6 | 12.2 | 14.43 | 14.86 | 11.15 | Present (L0 layer, L1 layer) |
| Comparative Example 2-3 | 19.5 | 11.9 | 4.8 | 14.7 | 9.97 | 10.67 | 13.59 | Present (L2 layer) |

Figure 3:
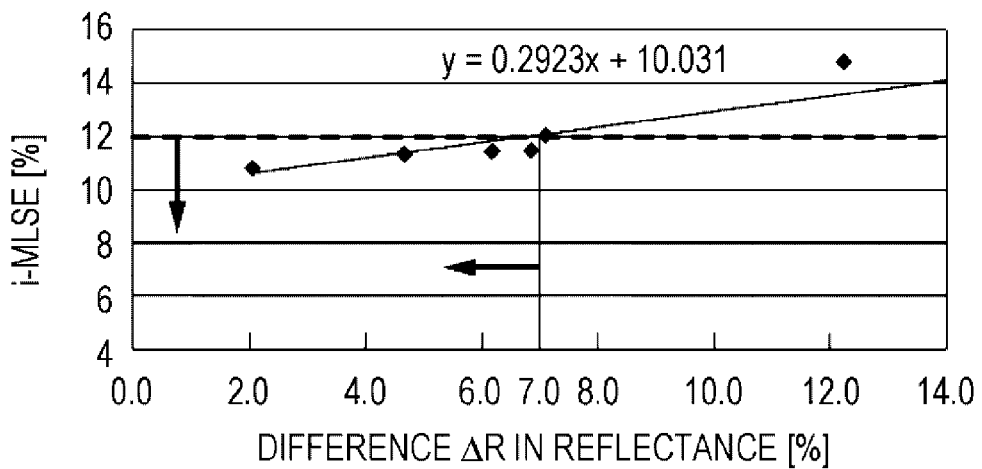
FIG. 3 is a diagram showing evaluation results of differences in reflectance and signal properties of optical recording media in Examples 2-1 to 2-4 and Comparative Examples 2-1 to 2-3.

L0 layer: first reproduction layer
L1 layer: second reproduction layer
L2 layer: third reproduction layer It is possible to know the following facts from Table 2 and FIG. 3.

When the difference delta R in the reflectance exceeded 7%, i-MLSE tended to exceed the reference value of 12%. In addition, technical meaning of setting the reference value of i-MLSE to 12% is as described above in "I. reflectance dependency of signal property".

Such a tendency is considered to be caused by the following reason. According to a multilayered optical recording medium, it is difficult to avoid an influence of stray light (crosstalk) from reflecting layers other than a reflecting layer from which an information signal is to be read. Particularly, a reflecting layer with low reflectance is easily affected by stray light from a reflecting layer with high reflectance, and if there is a combination of two reflecting layers which have an absolute value of the difference delta R in reflectance exceeding 7% among the multiple reflecting layers, i-MLSE (quality of the signal property) exceeds 12%, which results in degradation.

Therefore, the difference delta R in the reflectance is preferably equal to or less than 7% in order to set i-MLSE to be equal to or less than the reference value of 12%.

III. Reliability of Metal Oxide Layer

Example 3-1

An optical recording medium was obtained in the same manner as in Example 2-1 other than that the film thicknesses of the first reflecting layer (L0 layer), the second reflecting layer (L1 layer), and the third reflecting layer (L2 layer) were set to 19 nm, 15 nm, and 30 nm, respectively.

Example 3-2

An optical recording medium was obtained in the same manner as in Example 3-1 other than that the metal oxide layer with the film thickness of 20 nm, which was made of W—Fe—Ti—O (W:Fe:Ti=74:22.7:2.4 (% by mass)), was formed as the third reflecting layer.

Example 3-3

An optical recording medium was obtained in the same manner as in Example 3-1 other than that an alloy layer with the film thickness of 10 nm, which was made of Ag alloy, was formed as the third reflecting layer.

Evaluation 3

Reliability of the third reflecting layers of the optical recording media in Examples 3-1 to 3-3 obtained as described above was evaluated as follows.

Reliability

First, i-MLSE of the third reflecting layers was obtained in the same manner as in Reference Examples 1-1 to 1-7. Then, an acceleration test was conducted by placing the optical recording media in a 85% glasshouse environment at 80 degrees Celsius for 120 hours, and i-MLSE of the third reflecting layers was obtained in the same manner as in Reference Examples 1-1 to 1-7. Then, variation amounts of i-MLSE before and after the acceleration test (=[i-MLSE after the acceleration test]−[i-MLSE before the acceleration test]) were obtained. The results thereof will be shown in Table 3 and FIG. 4.

Table 3 shows configurations and evaluation results of the optical recording media in Examples 3-1 to 3-3.

TABLE 3

| | Material of L2 layer | Aging [h] | i-MLSE [%] | Variation amount of i-MLSE before and after acceleration test [%] |
| --- | --- | --- | --- | --- |
| Example 3-1 | ITO (In—Sn—O) | 0 | 9.4 | 0.1 |
| | | 120 | 9.5 | |
| Example 3-2 | W-based metal oxide (W—Fe—Ti—O) | 0 | 10.6 | 0.0 |
| | | 120 | 10.6 | |
| Example 3-3 | Ag alloy | 0 | 10.2 | 1.1 |
| | | 120 | 11.28 | |

L2 layer: third reproduction layer

Figure 4:
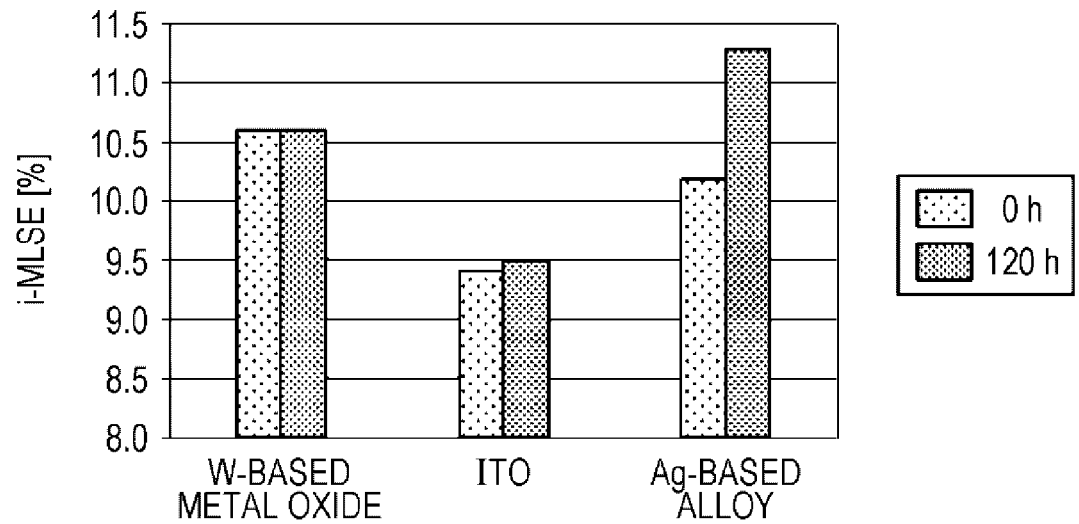
FIG. 4 is a diagram showing signal property evaluation results before and after an acceleration test of optical recording media in Examples 3-1 to 3-3.

It is possible to understand the following facts from Table 3 and FIG. 4.

In Example 3-3 (Ag-based alloy), i-MLSE before and after the acceleration test significantly differed from each other, and i-MLSE after the acceleration test is degraded compared to i-MLSE before the acceleration test by 1% or greater.

In Example 3-1 (ITO), i-MLSE before and after the acceleration test was substantially the same. Therefore, it is possible to significantly enhance the reliability by using binary metal oxide (ITO) containing In and Sn as a material of the third reflecting layer, as compared with a case of using a metal material. In addition, it is possible to expect substantially the same effect as that in the aforementioned case of using binary metal oxide even when unitary metal oxide which respectively contains In and Sn alone is used as the material of the third reflecting layer.

In Example 3-2 (W-based metal oxide), i-MLSE before and after the acceleration test was the same. Therefore, it is possible to significantly enhance the reliability by using ternary metal oxide which contains W, Fe, and Ti as a material of the third reflecting layer, as compared with the case of using metal material. In addition, it is possible to expect substantially the same effect as that of the aforementioned ternary metal oxide even when unitary metal oxide which respectively contains W, Fe, and Ti alone or binary metal oxide which contains a combination of two or more among W, Fe, and Ti is used as the material of the third reflecting layer. Moreover, it is possible to expect substantially the same effect as those of the aforementioned binary metal oxide and the ternary metal oxide even when metal oxide which includes a combination of one or more kinds selected from a group including W, Fe, and Ti and one or more kinds selected from a group including In and Sn is used.

Therefore, it is preferable to use, as a material of the third reflecting layer located at the closest position to the light irradiation surface, metal oxide which contains one or more kinds selected from a group including W, Fe, Ti, In, Sn, and Si from a viewpoint of enhancing the reliability.

According to knowledge of the present inventors, substantially the same effect as those of the aforementioned binary metal oxide and ternary metal oxide is caused even when unitary metal oxide which contains Zr alone is used. In addition, it is possible to expect substantially the same effect as those of the aforementioned binary metal oxide and the ternary metal oxide even when a combination of one or more kinds selected from a group including W, Fe, Ti, In, Sn and Si and Zr is used.

Therefore, it is preferable to use, as a material of the third reflecting layer located at the closest position to the light irradiation surface, metal oxide which contains one or more kinds selected from a group including W, Fe, Ti, In, Sn, Si, and Zr from a viewpoint of enhancing the reliability.

IV. Preferable Ranges of Refractive Index and Extinction Coefficient of Reflecting Layer Reference Example 4-1

First, a reflecting layer with a film thickness of 20 nm, which was made of ITO, was formed on an Si wafer by the sputtering method. In this process, oxygen content in the reflecting layer (that is, the composition of the reflecting layer) was changed by adjusting a film formation condition (an introduction amount of $O_2$ gas introduced into the vacuum chamber) of the sputtering for each sample. By such operations, targeted samples were obtained.

Reference Example 4-2

A reflecting layer with a film thickness of 20 nm, which was made of W—Fe—Ti—O, was formed on an Si wafer by the sputtering method. In this process, oxygen content in the reflecting layer (that is, the composition of the reflecting layer) was changed by adjusting a film formation condition (an introduction amount of $O_2$ gas introduced into the vacuum chamber) of the sputtering for each sample. Targeted samples were obtained in the same manner as in Reference Example 4-1 other than the aforementioned point.

Reference Example 4-3

First, a reflecting layer with a film thickness of 20 nm, which was made of Ag, was formed on an Si wafer by the sputtering method. By such operations, a targeted sample was obtained.

Reference Example 4-4

A sample was obtained in the same manner as in Reference Example 4-3 other than that a reflecting layer with a film thickness of 20 nm, which was made of Al, was formed on an Si wafer by the sputtering method.

Reference Example 4-5

A sample was obtained in the same manner as in Reference Example 4-3 other than that a reflecting layer with a film thickness of 20 nm, which was made of Au, was formed on an Si wafer by the sputtering method.

Reference Example 4-6

A sample was obtained in the same manner as in Reference Example 4-3 other than that a reflecting layer with a film thickness of 20 nm, which was made of Si, was formed on an Si wafer by the sputtering method.

Evaluation 4

Figure 5:
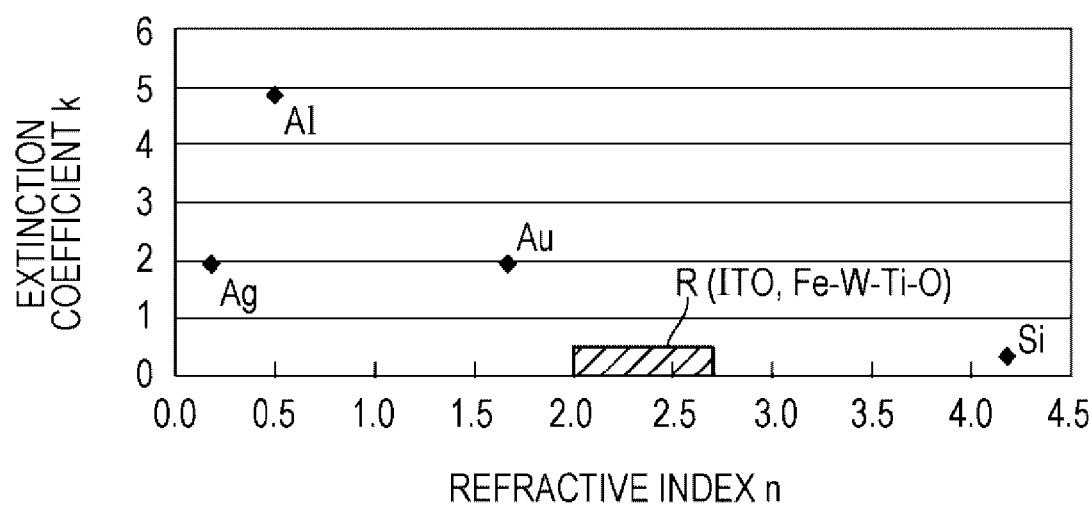
FIG. 5 is a diagram showing measurement results of refractive indexes n and extinction coefficients k of samples in Reference Examples 4-1 to 4-6.

Refractive indexes n and extinction coefficients k of the samples in Reference Examples 4-1 to 4-6 obtained as described above were measured. Specifically, the refractive indexes n and the extinction coefficients k when laser light with a wavelength of 405 nm was vertically incident to the film surfaces of the reflecting layers were measured by using a spectroscopic ellipsometer (manufactured by J.A. Woollam Co.; product name: VASE series Ellipsometers (HS-190 monochromator)). The results thereof will be shown in Table 4 and FIG. 5. In FIG. 5, a hatched region R represents a range of n and k measurement results of the reflecting layers in Reference Examples 4-1 and 4-2. The measurement results are shown by the region R as in the drawing because n and k were measured for a plurality of samples in which the reflecting layers have different compositions in Reference Examples 4-1 and 4-2.

Table 4 shows configurations and evaluation results of the optical recording media in Reference Examples 4-1 to 4-6.

TABLE 4

| | Material of recording layer | Refractive index n | Extinction coefficient k |
|---|---|---|---|
| Reference Example 4-1 | ITO | 2.0-2.3 | 0.01-0.1 |
| Reference Example 4-2 | Fe—W—Tl—O | 2.0-2.7 | 0.1-0.4 |
| Reference Example 4-3 | Ag | 0.17 | 1.95 |
| Reference Example 4-4 | Al | 0.49 | 4.86 |
| Reference Example 4-5 | Au | 1.658 | 1.956 |
| Reference Example 4-6 | Si | 4.17 | 0.363 |

It is possible to know the following facts from Table 4 and FIG. 5.

In the reflecting layer made of ITO (metal oxide layer), it is possible to change the refractive index n within a range from 2.0 to 2.3 and change the extinction coefficient k within a range from 0.01 to 0.1 by adjusting oxygen content in the reflecting layer.

In the reflecting layer made of W—Fe—Ti—O (metal oxide layer), it is possible to change the refractive index n within a range from 2.0 to 2.7 and change the extinction coefficient k within a range from 0.1 to 0.4 by adjusting oxygen content in the reflecting layer.

The refractive index n and the extinction coefficient k of the reflecting layer made of Ag, Al, Au, or Si (metal layer) were significantly different from those of the reflecting layer made of ITO or W—Fe—Ti—O.

The extinction coefficient of the reflecting layer made of Ag, Al, or Au is significantly larger than that of the reflecting layer made of ITO o r W—Fe—Ti—O. Although it is necessary to reduce the film thickness of the reflecting layer in order to realize high transmittance in the reflecting layer made of Ag, Al, or Au, durability significantly deteriorates if the film thickness is reduced as described above.

Although the extinction coefficient k of the reflecting layer made of Si is substantially the same as that of the reflecting layer made of ITO or W—Fe—Ti—O, the refractive index n of the reflecting layer made of Si is significantly larger than that of the reflecting layer made of ITO or W—Fe—Ti—O. Therefore, reflectance of the reflecting layer made of Si at the interfaces on an incident side and an outgoing side is significantly higher than that of the reflecting layer made of ITO or W—Fe—Ti—O, which brings about a decrease in light intensity of the laser light which reaches the first and second reflecting layers.

Accordingly, the metal oxide layer is more preferably used than the metal layer as the third reflecting layer located at the closest position to the light irradiation surface from the viewpoints of high transmittance and reliability.

When the metal oxide layer made of ITO or W—FeTi—O is used as the reflecting layer, it is possible to set the refractive index n within a range of equal to or greater than 2.0 and equal to or less than 2.7 and set the extinction coefficient k within a range of equal to or greater than 0.01 and equal to or less than 0.5 by adjusting oxygen content in the reflecting layer. In contrast, when the metal layer made of Ag, Al, or Si is used as the reflecting layer, the refractive index n and the extinction coefficient are not set within the aforementioned ranges.

Although only the case where the binary metal oxide containing In and Sn or ternary metal oxide containing W, Fe, and Ti is used as the material of the reflecting layer was described herein, it is possible to set the refractive index n within the range of equal to or greater than 2.0 and equal to or less than 2.7 and set the extinction coefficient k within the range of equal to or greater than 0.01 and equal to or less than 0.5 as long as the metal oxide contains one or more kinds selected from a group including W, Fe, Ti, In, Sn, Si, and Zr. In addition, it is possible to realize the third reflecting layer with high transmittance by setting the refractive index n and the extinction coefficient k within such ranges as described above.

V. Preferable Range for Film Thickness of Metal Oxide Layer (Lower Limit)

Examples 5-1 to 5-4

The film thickness of the first reflecting layer was changed to 19 nm, and the film thickness of the second reflecting layer was changed to 15 nm. In addition, the film thickness of the third reflecting layer was changed within a range from 15 nm to 35 nm as shown in Table 5. An optical recording medium was obtained in the same manner as in Example 3-2 other than the aforementioned points.

Evaluation 5

Signal properties and reflectance of the third reflecting layers of the optical recording media in Examples 5-1 to 5-4 obtained as described above were evaluated in the same manner as in Reference Examples 1-1 to 1-7. The results thereof will be shown in Table 5 and FIGS. 6A and 6B.

Table 5 shows configurations and evaluation results of the optical recording media in Examples 5-1 to 5-4.

TABLE 5

|  | Material of L2 layer | Film thickness [nm] | Reflectance [%] | i-MLSE [%] |
|---|---|---|---|---|
| Example 5-1 | ITO | 15 | 5 | 12 |
| Example 5-2 |  | 20 | 8.8 | 11 |
| Example 5-3 |  | 30 | 9.5 | 10.18 |
| Example 5-4 |  | 35 | 11.1 | 9.5 |

L2 layer: third reproduction layer

Figure 6A:
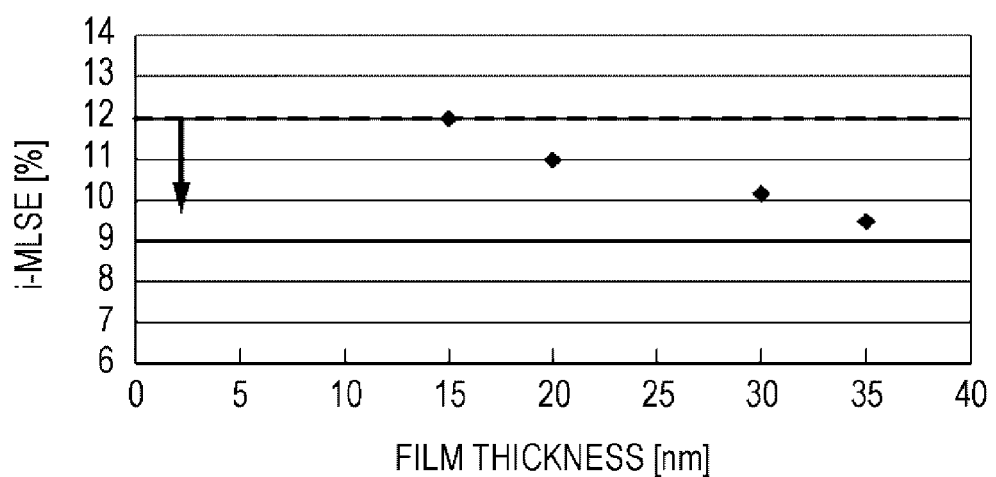
FIG. 6A is a diagram showing signal property evaluation results of optical recording media in Examples 5-1 to 5-4.
Figure 6B:
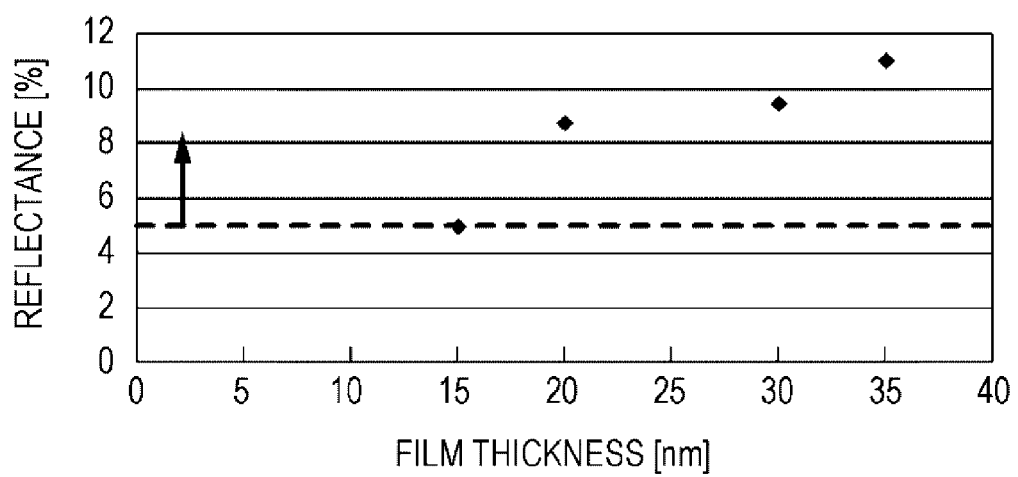
FIG. 6B is a diagram showing reflectance evaluation results of optical recording media in Examples 5-1 to 5-4.

It is possible to know the following facts from Table 5 and FIGS. 6A and 6B.

When the metal oxide layer made of W—Fe—Ti—O was used as the third reflecting layer, i-MLSE tended to be enhanced as the film thickness of the reflecting layer increased. When the film thickness was equal to or greater than 15 nm, it was possible to set i-MLSE to be equal to or less than the reference value of 12%.

When the metal oxide layer made of W—Fe—Ti—O was used as the third reflecting layer, reflectance tended to increase as the film thickness of the reflecting layer increased. When the film thickness was equal to or greater than 15 nm, it was possible to set the reflectance to be equal to or greater than 5%.

In addition, i-MLSE can be set to be equal to or less than the reference value of 12% when the reflectance is equal to or greater than 5% as described above in "I. Reflectance Dependency of Signal Property". Moreover, the reason that i-MSLE tended to be degraded as the film thickness of the third reflecting layer decreased was considered to be because a Signal-Noise Ratio (SNR) decreases due to a decrease in the reflectance.

Therefore, the film thickness of the third reflecting layer is preferably equal to or greater than 15 nm when the metal oxide layer was used as the third reflecting layer, from the viewpoint of enhancing the signal property.

VI. Preferable Range for Film Thickness of Metal Oxide Layer (Upper Limit)

Reference Example 6-1

A reflection spectrum and a transmission spectrum (incident angle theta: 0 deg) of a reflecting layer with a refractive index n=2.0 to 2.7 and an extinction coefficient k=0.01 to 0.5 were examined by simulation as described below. In addition, the simulation was conducted based on a method described in "Spectroscopic Ellipsometry written by Hiroyuki Fujiwara, 2.4 Optical Interference".

First, a configuration of an optical recording medium, in which a reflecting layer and a light transmission layer were sequentially laminated on the surface of an intermediate layer was set in a pseudo manner. Hereinafter, setting parameters of each component will be shown.

Light transmission layer: refractive index n=1.6, extinction coefficient k=0
Light transmission layer: refractive index n=2.0 to 2.7, extinction coefficient k=0.01 to 0.5, film thickness t=0 nm to 200 nm
(Here, numerical value ranges of the refractive indexes n and the extinction coefficients k are numerical value ranges on the assumption of the refractive index n and the extinction coefficient k of the reflecting layer made of metal oxide.)
Intermediate layer: refractive index n=1.6, extinction coefficient k=0
(However, the surface of the intermediate layer on which the reflecting layer was provided was a flat surface without concavities and convexities.)

Figure 7A:
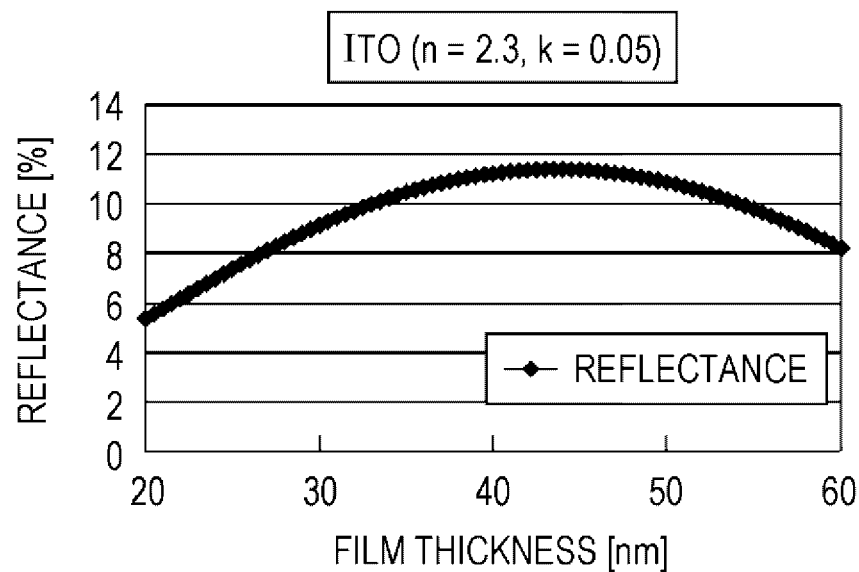
FIG. 7A is a diagram showing a reflection spectrum obtained by simulation in Reference Example 6-1.
Figure 7B:
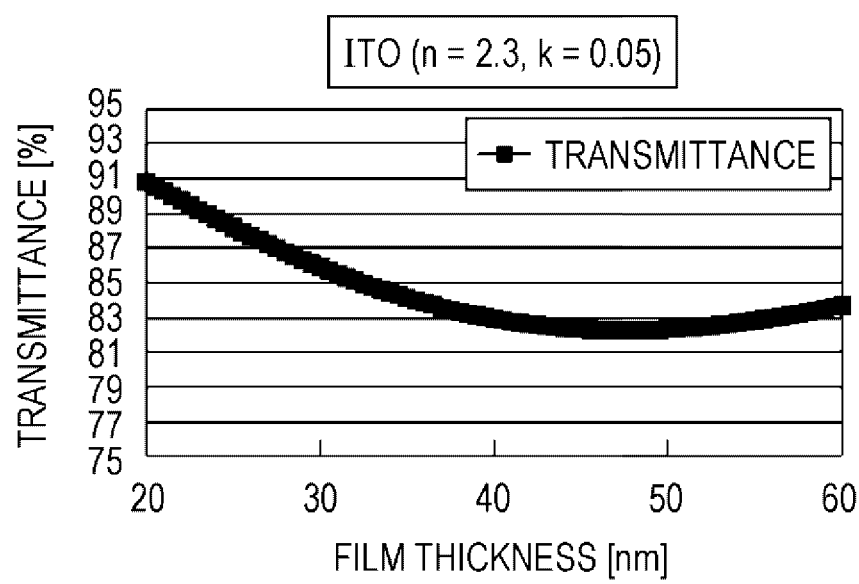
FIG. 7B is a diagram showing a transmission spectrum obtained by simulation in Reference Example 6-1.

Next, a reflection spectrum and a transmission spectrum when laser light was incident to the optical recording medium with the aforementioned configuration from the side of the light transmission layer were obtained. In addition, it was assumed that the laser light was not reflected by the surface of the light transmission layer. Among the results, representative examples when the refractive index n=2.3 and the extinction coefficient k=0.05 will be shown in FIGS. 7A and 7B. The n and k values correspond to n and k of ITO.

Reference Example 6-2

Figure 8A:
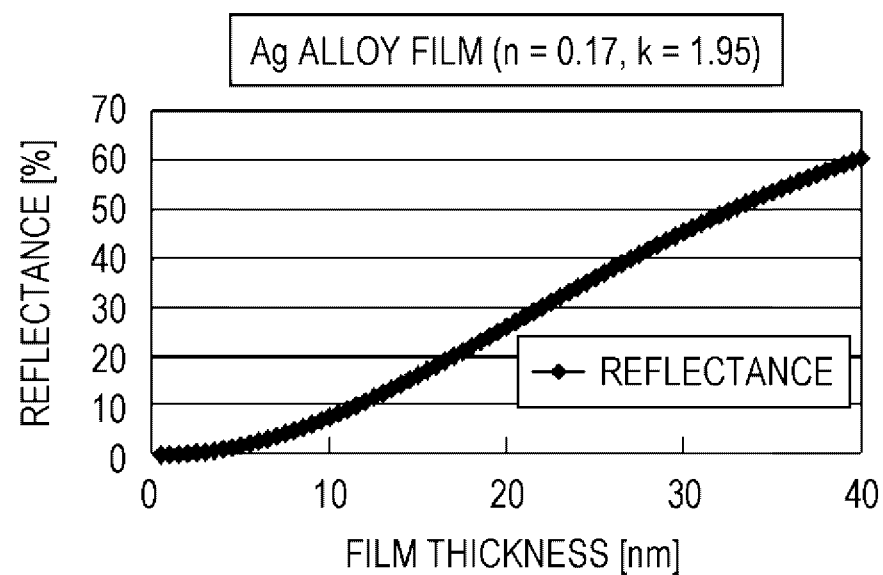
FIG. 8A is a diagram showing a reflection spectrum obtained by simulation in Reference Example 6-2.
Figure 8B:
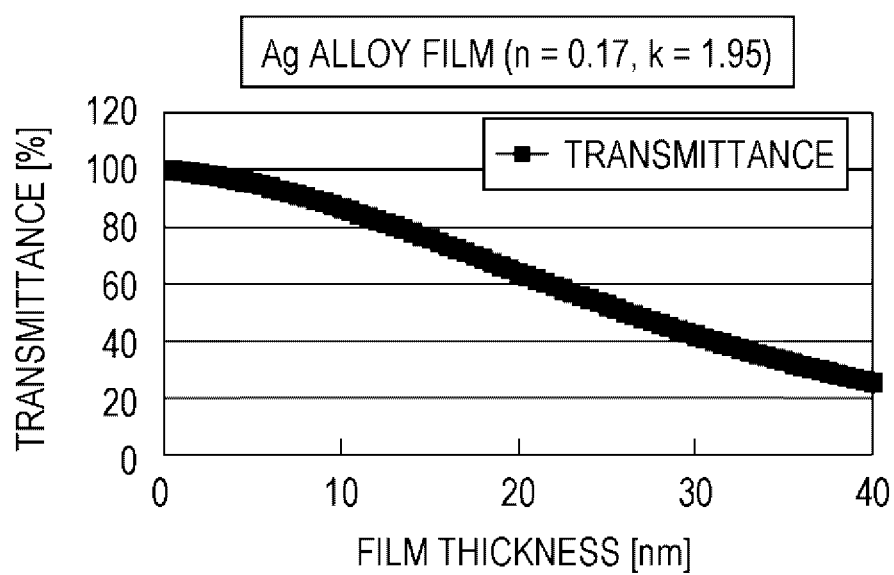
FIG. 8B is a diagram showing a transmission spectrum obtained by simulation in Reference Example 6-2.

A reflection spectrum and a transmission spectrum were obtained in the same manner as in Reference Example 6-1 other than that the refractive index n was changed to 0.17 and the extinction coefficient k was changed to 1.95. In addition, the refractive index n=0.17 and the extinction coefficient k=1.95 were numerical values on the assumption of the refractive index n and the extinction coefficient k of the reflecting layer made of Ag alloy. The results thereof will be shown in FIGS. 8A and 8B.

It is possible to know the following facts from the aforementioned simulation results in Reference Example 6-1.

In the ranges of the refractive index n=2.0 to 2.7 and the extinction coefficient k=0.01 to 0.5 on the assumption of the metal oxide layer as the reflecting layer, the reflection spectrum and the transmission spectrum periodically repeated increases and decreases while the film thickness of the reflecting layer increased. Then, the first peak value of the reflection spectrum with periodicity appeared at a position where the film thickness of the reflecting layer was equal to or less than 50 nm.

The film thickness of the reflecting layer is preferably thinner, and no technical advantage achieved by setting the film thickness of the reflecting layer to exceed 50 nm is found, from the viewpoints of a decrease in costs of the reflecting layer and reduction of the film formation time. Therefore, it is preferable to adjust the reflectance by changing the film thickness of the reflecting layer within a range of equal to or less than 50 nm, when the metal oxide layer is used as the reflecting layer.

Possible maximum reflectance (n=2.5, k=0.01) within the ranges of the refractive index n=2.0 to 2.7 and the extinction coefficient k=0.01 to 0.5 was about 18%. In the aforementioned simulation, the surface of the intermediate layer was set to a flat surface with no concavities and convexities. Since light scattering occurs due to concavities and convexities on a practical surface of the intermediate layer on which pits are present, the reflectance further deteriorates. In consideration of the point, the actual maximum reflectance is estimated to be about 15%.

When the metal oxide layer within the range of the refractive index n=2.0 to 2.7 and the extinction coefficient k=0.01 to 0.5 is used as the reflecting layer, it is possible to realize both the reflectance of equal to or greater than 5% and high transmittance by adjusting the film thickness of the reflecting layer.

It is possible to know the following facts from the aforementioned simulation results in Reference Example 6-2.

When the refractive index n=0.17 and the extinction coefficient k=1.95 on the assumption of the metal layer as the reflecting layer, the reflectance increased while the transmittance tended to decrease as the film thickness increased.

Although it is necessary to significantly reduce the film thickness of the reflecting layer in order to realize both the reflectance of equal to or greater than 5% and the high transmittance, if the thickness of the reflecting layer is reduced as described above, the reliability deteriorates as described above in "III. Reliability of Metal Oxide Layer".

VII. Film Thickness Dependency of Signal Property and Asymmetry

Examples 7-1-1 to 7-1-3

The film thickness of the first reflecting layer was changed to 19 nm, and the film thickness of the second reflecting layer was changed to 15 nm. In addition, the film thickness of the third reflecting layer was changed within a range from 15 nm to 30 nm as shown in Table 6. Optical recording media were obtained in the same manner as in Example 3-1 other than the aforementioned points.

Examples 7-2-1 to 7-2-3

The film thickness of the first reflecting layer was changed to 19 nm, and the film thickness of the second reflecting layer was changed to 15 nm. The film thickness of the third reflecting layer was changed within a range from 14 nm to 25 nm, as shown in Table 6. Optical recording media were obtained in the same manner as in Example 3-3 other than the aforementioned points.
Evaluation 6
Signal properties and asymmetry of the third reflecting layers of the optical recording media in Examples 7-1-1 to 7-1-3 and Examples 7-2-1 to 7-2-3 obtained as described above were evaluated as follows.
Signal Properties 3
In the same manner as in Reference Examples 1-1 to 1-7, i-MLSE of the third reflecting layers was obtained. The results thereof will be shown in Table 9A.
Asymmetry
Asymmetry is a criterion indicating a rate of an 8T signal and a 2T signal, and an asymmetry value which is closer to 0% means a more satisfactory 2T-8T balance. It is desirable to set the asymmetry value within plus-minus; 5% in terms of properties.

When it is assumed that I8H represents the maximum value of 8T amplitude of the reproduction signal, I8L represents the minimum value thereof, I2H represents the maximum value of 2T amplitude, and I2L represents the minimum value thereof, it is possible to express the asymmetry by an equation of asymmetry=$\{(I8H+I8L)-(I2H+I2L)\}/\{2(I8H-I8L)\}$. There is a relationship in which asymmetry is a "+" value when the 2T pit increases and asymmetry is a "−" value when the 2T pit decreases. The results thereof will be shown in FIG. 9B.

Table 6 shows configurations and evaluation results of the optical recording media in Examples 7-1-1 to 7-1-3 and Examples 7-2-1 to 7-2-3.

TABLE 6

| | Material of L2 layer | Film thickness [nm] | i-MLSE [%] | Asymmetry |
|---|---|---|---|---|
| Example 7-1-1 | ITO dielectric body (In, Sn, O) | 30 | 9.7 | −3 |
| Example 7-1-2 | | 20 | 11 | −1.44 |
| Example 7-1-3 | | 15 | 12.1 | 0 |
| Example 7-2-1 | Ag alloy | 25 | 10.29 | 8 |
| Example 7-2-2 | | 20 | 9.7 | 4 |
| Example 7-2-3 | | 14 | 9.2 | 0 |

L2 layer: third reproduction layer

Figure 9A:
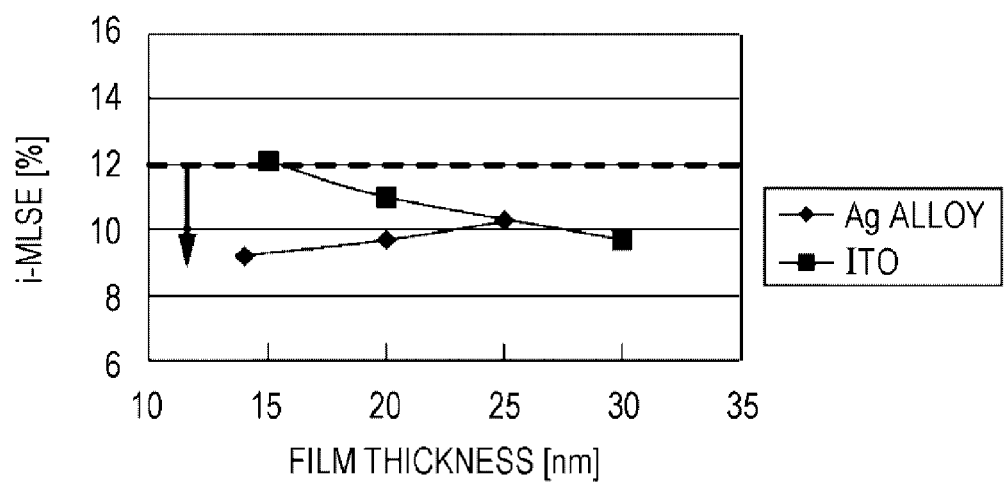
FIG. 9A is a diagram showing signal property evaluation results of optical recording media in Examples 7-1-1 to 7-1-3 and 7-2-1 to 7-2-3.
Figure 9B:
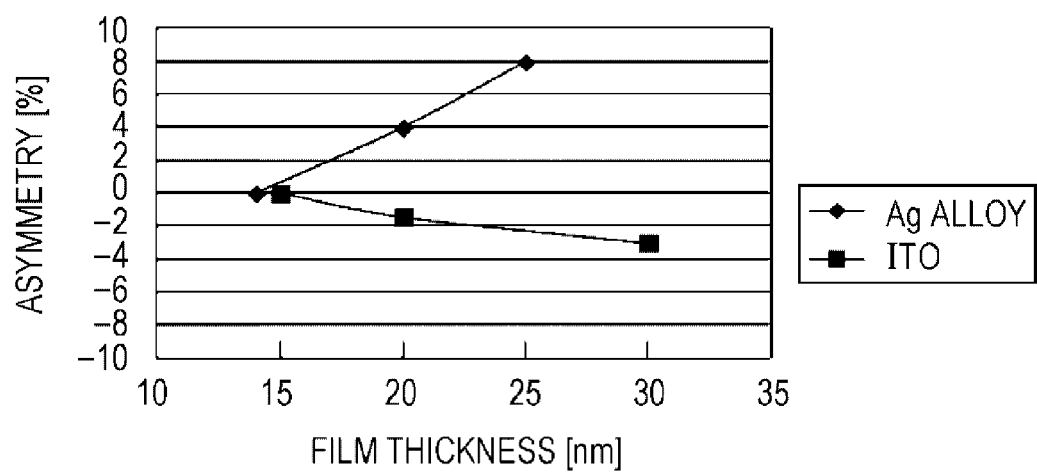
FIG. 9B is a diagram showing asymmetry evaluation results of optical recording media in Examples 7-1-1 to 7-1-3 and 7-2-1 to 7-2-3.

It is possible to know the following facts from FIGS. 9A and 9B.

Film thickness dependency of i-MLSE and asymmetry (that is, an optical depth of the minimum pit 2T) completely differed as described below depending on which one of the metal oxide layer (dielectric layer) and the metal layer was used as the third reflecting layer.

When the metal oxide layer was used as the third reflecting layer, i-MLSE tended to be enhanced as the film thickness of the reflecting layer increased. In contrast, when the metal layer was used as the third reflecting layer, i-MLSE tended to deteriorate as the film thickness of the reflecting layer increased.

Therefore, a preferable film thickness range differed from the viewpoint of the signal property depending on which one of the metal oxide layer and the metal layer was used as the third reflecting layer. For example, substantially the same signal properties were obtained in a case where the film thickness of the metal oxide layer was set to about 30 nm and a case where the film thickness of the metal layer was set to about 15 nm.

When the metal oxide layer was used as the third reflecting layer, the asymmetry tended to moderately decrease as the film thickness of the reflecting layer increased. In contrast, when the metal layer was used as the third reflecting layer, the asymmetry tended to increase as the film thickness of the reflecting layer increased.

Such a tendency can be described in other words as follows if a fact that the asymmetry is a criterion indicating an optical depth of the minimum pit 2T is taken into consideration. That is, when the metal oxide layer was used as the third reflecting layer, the optical depth of the minimum pit (concave-shaped pit) 2T tended to look shallower as the film thickness of the reflecting layer increased. In contrast, when the metal layer was used as the third reflecting layer, the optical depth of the minimum pit 2T tended to look deeper as the film thickness of the reflecting layer increased.

It is considered that the differences in the refractive indexes n and the extinction coefficients k of materials of the third reflecting layer cause the differences in the film thickness dependency of the signal property and the asymmetry depending on which one of the metal oxide (dielectric body) and the metal is used as the material of the reflecting layer as described above. Hereinafter, a specific description will be given of this point.

Metal n and k generally has relationships of n<1 and k>1, and n and k of Ag satisfy n=0.17 and k=1.95, for example. In contrast, n and k of the metal oxide (dielectric body) preferably used in the present technology satisfy the refractive index n=2.0 to 2.7 and the extinction coefficient k=0.01 to 0.5 as described above, and for example, n and k of ITO satisfy n=2.3 to 2.4 and k=0.2.

The differences in n and k causes a difference in intensity of interface reflected light at an interface between the third reflecting layer and the light transmission layer (hereinafter, referred to as an "incident-side interface") and at an interface between the third reflecting layer and the intermediate layer (hereinafter, referred to as an "outgoing-side interface").

When metal such as Ag is used as a material of the third reflecting layer, the metal has a large k value, and therefore, the amount of the laser light absorbed in the third reflecting layer is large. In contrast, when metal oxide such as ITO is used as a material of the third reflecting layer, the metal oxide has a k value which is close to 0, and therefore, the amount of the laser light absorbed in the third reflecting layer is remarkably small.

In addition, metal oxide such as ITO (n=2.5) has a small refractive index difference delta n from those of transparent resin layers (typically n=about 1.6) such as the light transmission layer and the intermediate layer, as compared with metal such as Ag (n=0.17).

When metal oxide is used as the third reflecting layer as described above, the amount of light absorption is smaller and the refractive index difference delta n is smaller compared to those in the case where metal is used as the third reflecting layer, and therefore, an optical interference action at the incident-side interface and the outgoing-side interface efficiently works. In addition, efficiency of the interference action does not significantly change even if the thickness of the third reflecting layer increases.

Ratios of the reflected light intensity at the outgoing-side interface with respect to the reflected light intensity at the incident-side interface greatly differ when metal is used as a material of the third reflecting layer and when metal oxide is used as a material of the third reflecting layer.

It is considered that the aforementioned difference results in differences in film thickness dependency of the signal property and the asymmetry (appearances of the pits).

If the aforementioned results are taken into consideration, the pits of the third reflecting layer are preferably deeper than those of the first and second reflecting layers in order to suppress differences in the asymmetry (appearances of the pits) of the first, second, and third reflecting layers when the metal layers are used as the first and second reflecting layers and the metal oxide layer is used as the third reflecting layer.

Although embodiments of the present technology were specifically described above, the present technology is not limited to the aforementioned embodiments, and various modifications can be made based on technical ideas of the present technology.

For example, configurations, methods, processes, shapes, materials, numerical values, and the like in the aforementioned embodiments were described only for illustrative purposes, and configurations, methods, processes, shapes, materials, numerical values, and the like which are different from those in the description may be used as necessary.

In addition, the configurations, the methods, the processes, the shapes, the materials, the numerical values, and the like in the aforementioned embodiments can be combined within a gist of the present technology.

In addition, the terms "including" (comprising) used in the present technology include "consisting essentially of" and "consisting of" which are more restrictive terms.

Although the aforementioned embodiments were described as an example in which the present technology was applied to an optical recording medium with the configuration of three reflecting layers and the light transmission layer laminated on the substrate in this order so as to reproduce an information signal by irradiating the three reflecting layers with laser light from the side of the light transmission layer, the present technology is not limited to the example. For example, it is possible to apply the present technology to an optical recording medium with a configuration of three reflecting layers and a protective layer laminated on a substrate in this order so as to reproduce an information signal by irradiating the three reflecting layers with laser light from the side of the substrate or an optical recording medium with a configuration of three reflecting layers provided between two substrates so as to reproduce an information signal by irradiating the three reflecting layers with laser light from a side of one substrate.

Although the aforementioned embodiments were described as an example in which the present technology was applied to an optical recording media provided with three reflecting layers, the present technology is not limited to the example. For example, it is possible to apply the present technology to a multilayered optical recording medium provided with four or more reflecting layers or a two-layered optical recording medium provided with two reflecting layers. In such cases, a reflecting layer located at the closest position to the light irradiation surface preferably contains metal oxide or metal nitride. This is because it is possible to enhance reliability of the optical recording medium.

In the aforementioned embodiments, all the absolute values (that is, absolute value of (R1-R2) and absolute value of (R2-R3)) of differences delta R in reflectance of adjacent two reproduction layers selected from the reflectance R1, R2, and R3 may be equal to or less than 7%. If the differences delta R in reflectance exceed 7%, light reflected by the reflecting layer L with low reflectance is affected by stray light from the adjacent reflecting layer L with high reflectance, and the signal property deteriorates.

The present technology can employ the following configurations.

(1) An optical recording medium including: three reproduction layers, wherein reflectance R1, R2, and R3 of the three reproduction layers on a side of a surface irradiated with reproduction light is equal to or greater than 5%, and wherein any absolute value of a difference delta R between two selected from the reflectance R1, R2, and R3 is equal to or less than 7%.

(2) The optical recording medium according to (1), wherein a reproduction layer located at the closest position to the surface among the three reproduction layers contain metal oxide.

(3) The optical recording medium according to (2), wherein the metal oxide contains one or more kinds selected from a group including W, Fe, Ti, In, Sn, Si, and Zr.

(4) The optical recording medium according to (2) or (3), wherein a film thickness of the reproduction layer located at the closest position to the surface among the three reproduction layers is within a range of equal to or greater than 15 nm and equal to or less than 50 nm.

(5) The optical recording medium according to any one of (1) to (4), wherein the reflectance R1, R2, and R3 of the three reproduction layers on the side of the surface irradiated with the reproduction light is equal to or greater than 7% and equal to or less than 14%.

(6) The optical recording medium according to any one of (1) to (5), wherein a refractive index of the reproduction layer located at the closest position to the surface among the three reproduction layers is within a range of equal to or greater than 2.0 and equal to or less than 2.7, and wherein an extinction coefficient of the reproduction layer located at the closest position to the surface among the three reproduction layers is within a range of equal to or greater than 0.01 and equal to or less than 0.5.

(7) The optical recording medium according to (1), wherein the reproduction layer located at the closest position to the surface among the three reproduction layers contain metal nitride.

(8) The optical recording medium according to (1), wherein the three reproduction layers includes a first reproduction layer containing metal, a second reproduction layer containing metal, and a third reproduction layer containing metal oxide, and wherein the third reproduction layer is located at the closest position to the surface.

(9) The optical recording medium according to (8), wherein a film thickness of the third reproduction layer is larger than film thicknesses of the first reproduction layer and the second reproduction layer.

(10) The optical recording medium according to (8) or (9), wherein pits of the third reproduction layer are deeper or higher than those of the first reproduction layer and the second reproduction layer.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10 optical recording medium
11 substrate
11a land
11b pit
12 light transmission layer
L, L0 to L2 reproduction layer
S1, S2 intermediate layer
C light irradiation surface

The invention claimed is:

1. An optical recording medium comprising:
   three reproduction layers,
      wherein reflectance R1, R2, and R3 of the three reproduction layers on a side of a surface irradiated with reproduction light is equal to or greater than 5%,
      wherein any absolute value of a difference delta R between two selected from the reflectance R1, R2, and R3 is equal to or less than 7%; and
      wherein the three reproduction layers includes a first reproduction layer containing metal, a second reproduction layer containing metal, and a third reproduction layer containing metal oxide, and wherein the third reproduction layer is located at the closest position to the surface.

2. The optical recording medium according to claim 1, wherein a reproduction layer located at the closest position to the surface among the three reproduction layers contain metal oxide.

3. The optical recording medium according to claim 2, wherein the metal oxide contains one or more kinds selected from a group consisting of W, Fe, Ti, In, Sn, Si, and Zr.

4. The optical recording medium according to claim 2, wherein a film thickness of the reproduction layer located at the closest position to the surface among the three reproduction layers is within a range of equal to or greater than 15 nm and equal to or less than 50 nm.

5. The optical recording medium according to claim 1, wherein the reflectance R1, R2, and R3 of the three reproduction layers on the side of the surface irradiated with the reproduction light is equal to or greater than 7% and equal to or less than 14%.

6. The optical recording medium according to claim 1, wherein a refractive index of the reproduction layer located at the closest position to the surface among the three reproduction layers is within a range of equal to or greater than 2.0 and equal to or less than 2.7, and wherein an extinction coefficient of the reproduction layer located at the closest position to the surface among the three reproduction layers is within a range of equal to or greater than 0.01 and equal to or less than 0.5.

7. The optical recording medium according to claim 1, wherein the reproduction layer located at the closest position to the surface among the three reproduction layers contain metal nitride.

8. The optical recording medium according to claim 1, wherein a film thickness of the third reproduction layer is larger than film thicknesses of the first reproduction layer and the second reproduction layer.

9. The optical recording medium according to claim 1, wherein pits of the third reproduction layer are deeper or higher than those of the first reproduction layer and the second reproduction layer.

* * * * *